Nov. 28, 1950    W. E. RAMSEY    2,531,586
RETRIEVING DEVICE FOR ARTICLES SUBMERGED IN WATER
Filed Nov. 30, 1948
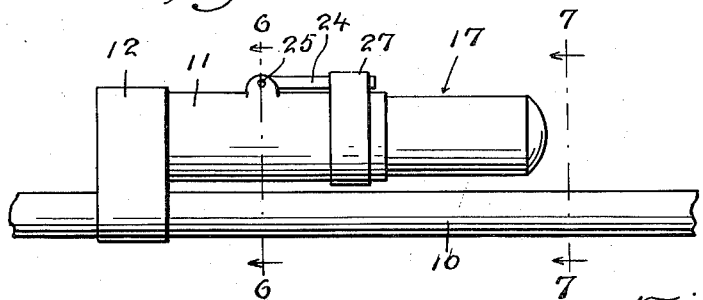
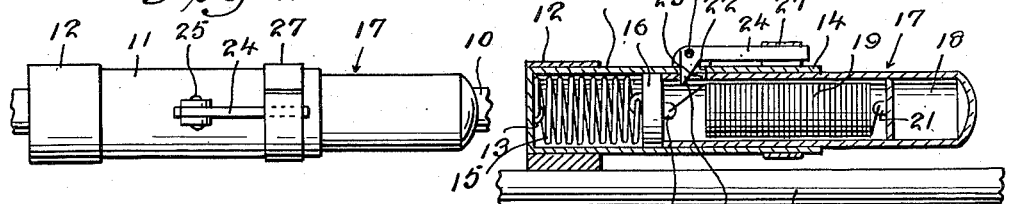
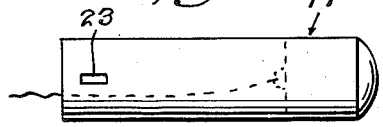
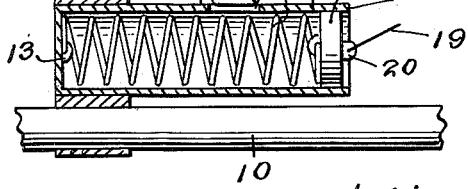
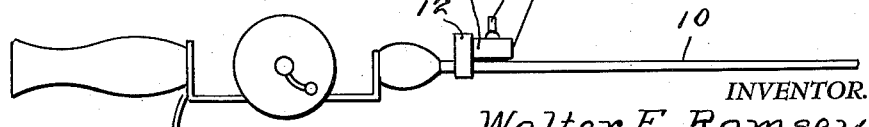
INVENTOR.
Walter E. Ramsey
BY Victor J. Evans & Co.
ATTORNEYS Patented Nov. 28, 1950

2,531,586

UNITED STATES PATENT OFFICE 2,531,586

RETRIEVING DEVICE FOR ARTICLES SUBMERGED IN WATER

Walter E. Ramsey, Graham, Tex.

Application November 30, 1948, Serial No. 62,661

2 Claims. (Cl. 9—9)

This invention relates to retrieving devices for fishing rods and the like, which are accidentally submerged in deep water.

The object of the invention is to provide a device for indicating the position of articles dropped into and submerged in bodies of water.

Another object of the invention is to provide a device for attachment to fishing rods and the like, which device is adapted, should the article fall into the water, to release a float attached by a line to the article whereby the float and line will aid in locating and subsequently recovering the article.

A further object of the invention is to provide a retrieving device which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a side elevational view of the retrieving device, attached to a fragmentary portion of a fishing rod;

Figure 2 is a top plan view of the device of Figure 1;

Figure 3 is a vertical sectional view of the device of Figure 1;

Figure 4 is a top plan view of the float;

Figure 5 is a vertical sectional view showing the position of certain parts when the device is in indicating position;

Figure 6 is a sectional view taken on the line 6—6 of Figure 1;

Figure 7 is a sectional view taken on the line 7—7 of Figure 1;

Figure 8 is a side elevational view of a retrieving device attached to a fishing rod and reel and showing the indicating float in indicating position.

Referring in detail to the drawings, the numeral 10 designates a portion of a fishing rod to which the retrieving device is attached. The retrieving device comprises a tubular housing 11 which is attached to the fishing rod by a suitable strap or bracket 12 and the housing 11 has one end closed by the end wall 13 and its other end open, as at 14. Positioned within the housing 11 is a coil spring 15 having one end secured to the end wall 13 and its other end secured to a disc or cap 16 which is slidably arranged in the housing.

Projecting into the open end of the housing 11 is a portion of a float member 17 which includes a chamber or compartment 18, Figure 3, holding therein air or other suitable gas for providing the necessary buoyancy for the float member. A cord or cable 19 has one end secured to a lug 21 that projects from the float member 17.

For releasably maintaining the float member 17 attached to the housing 11, a first slot 22 is arranged in the housing. A second slot 23 is arranged in the float member and is adapted to register with the slot 22 when the float member 17 is confined in the housing. A trigger 24 is pivotally secured to the housing 11, as at 25, and normally the tip 26 of the trigger 24 passes through the registering slots 22 and 23. A band of paper 27 extends around the trigger 24 and around the housing for releasably holding the tip 26 in engagement with the registering slots. The band 27 is fabricated of paper which dissolves or disintegrates when it is submerged under water.

In use, the retrieving device is assembled and attached to the fishing rod 10, Figure 1. In the event the rod or other article is accidentally dropped in the water, the paper band 27 will disintegrate, and the spring 15 will force the disc 16 toward the open end of the housing 12 to thereby expel the float member 17 from the housing. The float member 17 is attached to the housing by the cord 19 and the float member 17 will rise to the surface to indicate the position of the submerged article. If the submerged article is not heavy it can be raised to the surface by the string 19, and if the submerged article is a large one, the float member 17 will mark the location of the submerged article so that it can be located and recovered by the divers.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a retrieving device for articles submerged in water, a tubular housing connected to said article and including a closed end, said housing being provided with an open end, a coil spring positioned in said housing and having one end secured to the closed end thereof, a disc slidably arranged in said housing and connected to the other end of said spring, a float member projecting into the open end of said housing and mounted for sliding movement into and out of the latter, a cord having one end secured to said disc and its other end secured to said float member, said housing having a slot therein intermediate its ends, said floating member being provided with a slot for registering with the slot in said housing, a trigger pivotally connected to said housing and having a portion thereof projecting through said registering slots, and a band disintegratable by the action of water for maintaining said trigger in engagement with said slots.

2. In a retrieving device for articles submerged in water, a tubular housing connected to said article and including a closed end, said housing being provided with an open end, a coil spring positioned in said housing and having one end secured to the closed end thereof, a disc slidably arranged in said housing and connected to the other end of said spring, a float member projecting into the open end of said housing and mounted for sliding movement into and out of the latter, said float member embodying a sealed chamber containing air therein, a cord having one end secured to said disc and its other end secured to said float member, said housing having a slot therein intermediate its ends, said float member being provided with a slot for registering with the slot in said housing, a trigger pivotally connected to said housing and having a portion thereof projecting through said registering slots, and a band disintegratable by the action of water for maintaining said trigger in engagement with said slots.

WALTER E. RAMSEY.

REFERENCES CITED

The following references are of record in the file of this patent:

UNITED STATES PATENTS

| Number | Name | Date |
|---|---|---|
| 806,730 | Zoll | Dec. 5, 1905 |
| 2,419,162 | Pope, Sr. | Apr. 15, 1947 |

FOREIGN PATENTS

| Number | Country | Date |
|---|---|---|
| 19,824 | Great Britain | 1892 |
| 25,670 | Great Britain | 1913 |